J. W. FRAZIER & F. E. HANSEN.
COMBINED PRESSURE GAGE AND INFLATING DEVICE.
APPLICATION FILED SEPT. 13, 1915.
1,196,226.
Patented Aug. 29, 1916.
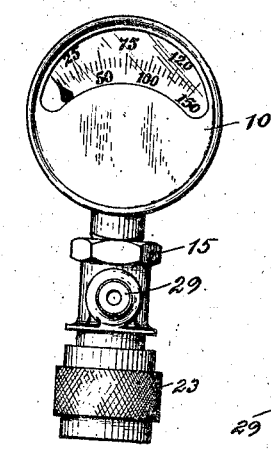
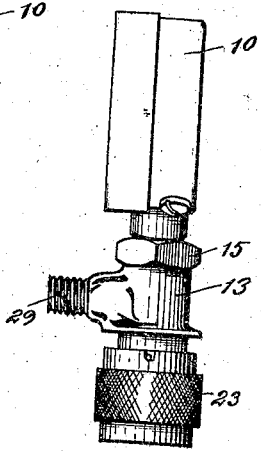
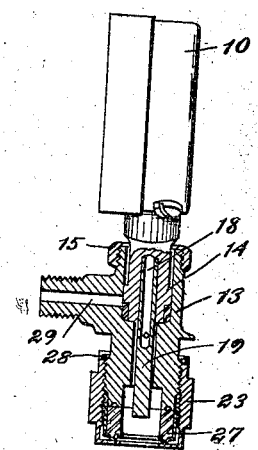
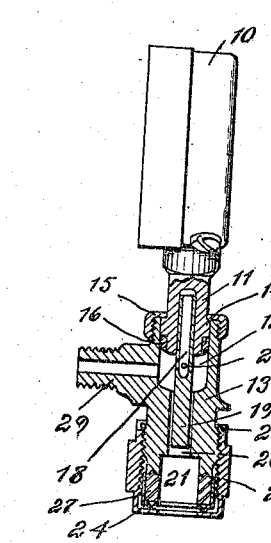
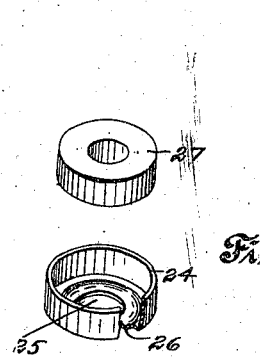

UNITED STATES PATENT OFFICE.

JAMES W. FRAZIER AND FRED E. HANSEN, OF CLEVELAND, OHIO.

COMBINED PRESSURE-GAGE AND INFLATING DEVICE.

1,196,226.  Specification of Letters Patent.  Patented Aug. 29, 1916.

Application filed September 13, 1915. Serial No. 50,343.

*To all whom it may concern:*

Be it known that we, JAMES W. FRAZIER and FRED E. HANSEN, citizens of the United States, residing at Cleveland, in the county of Cuyahoga and State of Ohio, have invented a certain new and useful Improvement in Combined Pressure-Gages and Inflating Devices, of which the following is a full, clear, and exact description, reference being had to the accompanying drawings.

This invention relates generally to tire inflating devices and more particularly to a combination pressure gage and tire inflater the object being to provide a simple and efficient combination device by means of which the tire pressure can be quickly and easily gaged or indicated, and additionally inflated if desired.

Another object of the invention is to provide a novel form of connection between the pressure gage and inflater whereby the supply connection can be checked while the tire pressure is being gaged, and automatically opened when additional pressure or inflation of the tire is desired.

Another object of the invention is to provide a simple and efficient tire valve connection for the inflating device.

With these various objects in view our invention consists essentially in combining a pressure gage with a close connection and tire valve connection, said gage being movable to cut off the hose connection for the purpose of gaging tire pressure.

The invention consists also in certain novel features of construction and combination of parts hereinafter fully described and pointed out in the claims.

In the drawings forming a part of this specification Figure 1 is a face view of a combined pressure gage and tire inflater constructed in accordance with our invention; Fig. 2 is a side view of the same; Fig. 3 is a sectional view, partly in elevation, showing the position of the parts when the tire pressure is being gaged; Fig. 4 is a similar view showing the position of the parts when the tire is being inflated; and Figs. 5 and 6 are details of construction.

In the practical embodiment of our invention we employ a pressure gage 10 which may be of the usual or any approved construction and which is provided with a stem 11, which is intended to extend into the upper chamber or bore 12 of the casing 13, the stem 11 being constructed or provided with an annular collar or shoulder 14 which fits snugly within the bore or chamber 12 and the upward movement of the gage and its stem is limited by the cap or gasket 15 screwed upon the upper end of the casing 13. A leather or other suitable piston 16 is secured upon the lower end of the stem directly beneath the annular collar 14 and held thereon by means of a nut 17 as most clearly shown in Fig. 6. The stem 11 is bored and has a tube 18 fitted into the same, the lower end of this tube being closed or made solid as shown at 19, and is intended to extend into the passage 20 produced in the casing 13 and communicating with the lower chamber or bore 21; this end 19 being slightly smaller in diameter than the passage 20 so that air can pass freely around the same. The tubular portion 18 has one or more perforations 22 through which air can pass to the pressure gage 10.

The lower end of the casing is externally threaded, and carries a nut or sleeve 23, the lower portion of which is devoid of threads and is adapted to receive the metallic cup 24 apertured centrally as shown at 25, and preferably constructed with an annular corrugation 26 which is adapted to rest upon the internal flange or shoulder at the lower end of the nut.

An elastic ring 27 preferably of rubber is fitted in the metallic cup or container 24, said elastic ring contacting with the lower end of the casing, and when the nut or sleeve 23 is turned so as to move the same upwardly upon the casing the elastic ring will be compressed and inasmuch as the metallic cup or retainer holds the ring against lateral expansion it is obvious that said ring will expand inwardly and consequently the central opening thereof will be contracted thereby firmly grasping the tire valve stem which is inserted through the apertured end of the nut and retainer, this valve stem projecting into the lower chamber or bore 21.

The sleeve or nut 23 is preferably provided with a lock ring 28 to prevent the nut being screwed too far and in practice we prefer to construct the nut with a left hand thread.

The casing is also constructed with a bored lateral extension 29 to which the air supply hose is connected, the bore communicating with the upper chamber 12 of the casing.

In operation, the end of the tire valve stem is inserted in the lower chamber 21 and the nut or sleeve 23 is rotated to compress the elastic ring 27 about said stem. The pressure gage 10 is then forced down to the position shown in Fig. 3 and the member 19 will engage the pin of the tire valve and unseat the valve and the air in the tire will immediately pass upwardly around the member 19 through the opening 20 and tube 18 into the pressure gage and indicate the pressure within the tire. The air supply through the passage 29 is cut off at this time by the piston-like portion of the gage stem and extending across the air supply passage, and inasmuch as the supply connection is completely closed the pressure gage will correctly indicate the pressure within the tire and if additional air is desired then the manual pressure, which has been exerted upon the gage to hold the same down to the position shown in Fig. 3, is removed, and the air pressure immediately raises the gage to the position shown in Fig. 4 and the stem of the gage will be lifted clear of the air passage 29 and the air can then pass into the chamber 12 down through the passage 20 into the tire valve stem, the pressure of course automatically unseating the tire valve and at the same time communication is established with the gage so that tire pressure will be indicated during the inflating operation. When the desired pressure has been indicated the device can be quickly and easily detached from the tire valve stem by simply rotating the nut or sleeve in the reverse direction and lifting the device from the stem. Then if desired the air supply can be checked by simply forcing down the gage and its stem, cutting off the air as previously described. The connection for the tire stem herein shown and described is the same as the connection shown and described in our application of even date, but it is obvious that any other form of tire valve connection could be utilized in connection with the gage stem and casing without interfering with the operation of said parts.

By means of this device it is possible to quickly and accurately gage the tire pressure and by the same apparatus automatically connect the air supply whenever additional air pressure is needed.

Having thus described our invention, what we claim is:—

1. In a device of the kind described, the combination with a casing having a hose connection and a tire valve connection, of a gage connected to the casing, the stem of said gage being movable within the casing and adapted to open and close the hose connection, said stem carrying means for opening the tire valve as set forth.

2. In a device of the kind described, the combination with a casing having a tire valve connection at its lower end, a hose pipe connection intermediate its ends, and a pressure gage movably connected to the upper end of said casing, said pressure gage having a stem fitting into the casing, said stem being provided with means for closing the hose connection and opening the tire valve connection when said stem of the gage is moved into the casing.

3. In a device of the character described, the combination with a casing, having a hose connection and a tire valve connection, of a pressure gage, the stem portion of said gage being movably connected to the casing, and adapted to close the hose connection and simultaneously open the tire valve, when said stem is moved into said casing.

4. In a device of the kind described the combination with a casing having a tire valve connection at its lower end, a pressure gage movably connected to the upper end of said casing, a hose pipe connection intermediate the ends of said casing, said pressure gage having a stem fitting into the casing, said stem carrying a piston adapted to close the hose connection, and a tire valve opening member carried also by said gage stem as set forth.

5. In a device of the character described the combination with a casing having a nut adjustably connected to its lower end, a metallic cup carried by said nut, an elastic ring arranged within said cup and adapted to be brought into contact with the end of the casing by the movement of the nut and cup, said casing having an upper and lower chamber and a connecting passage, a pressure gage having a stem provided with a piston arranged in the upper chamber of the casing, a perforated tube fitted into the gage stem and closed at its lower end, said closed portion resting within the connecting passage of the casing, and a hose connection leading into the upper chamber of the casing, said hose connection being adapted to be closed by the gage stem piston for the purpose specified.

6. In a device of the character described the combination with a casing having upper and lower chambers and a connecting passage, the lower chamber being adapted to receive a tire valve stem, an elastic ring arranged at the lower end of the casing, a cup for containing said ring, and an adjustable member attached to the casing for moving said cup and ring whereby said ring is compressed at the end of the casing, a pressure gage having a stem fitting in the upper chamber of the casing and a perforated tube fitted into said stem, the lower end of said tube being solid and resting in the passage connecting the upper and lower chambers.

In testimony whereof, we hereunto affix our signatures in the presence of a witness.

JAMES W. FRAZIER.
FRED E. HANSEN.

Witness:
HUGH B. McGILL.